United States Patent [19]

Matyas

[11] Patent Number: 4,771,461
[45] Date of Patent: Sep. 13, 1988

[54] INITIALIZATION OF CRYPTOGRAPHIC VARIABLES IN AN EFT/POS NETWORK WITH A LARGE NUMBER OF TERMINALS

[75] Inventor: Stephen M. Matyas, Kingston, N.Y.

[73] Assignee: International Business Machines Corporation, Armonk, N.Y.

[21] Appl. No.: 879,784

[22] Filed: Jun. 27, 1986

[51] Int. Cl.⁴ .............................................. H04L 9/04
[52] U.S. Cl. ..................................... 380/24; 380/25; 380/48
[58] Field of Search ............... 178/22.08, 22.09, 22.11; 380/23, 24, 25, 30, 48

[56] References Cited

U.S. PATENT DOCUMENTS

| | | | |
|---|---|---|---|
| 4,386,233 | 5/1983 | Smid et al. | 178/22.08 |
| 4,438,824 | 3/1984 | Mueller-Schloer | 178/22.11 |
| 4,453,074 | 6/1984 | Weinstein | 178/22.11 |
| 4,458,109 | 7/1984 | Mueller-Schloer | 178/22.11 |
| 4,536,647 | 8/1985 | Atalla et al. | 178/22.08 |
| 4,578,531 | 3/1986 | Everhart et al. | 178/22.11 |

OTHER PUBLICATIONS

"A method for Obtaining Digital Signatures and Public-key Cryptosystems", by Rivest et al.; communications of the ACM Feb. 1978, vol. #21, #2.

Primary Examiner—Salvatore Cangialosi
Attorney, Agent, or Firm—Redmond, Joseph C.; John E. Hoel, Jr.; G. E. Clark

[57] ABSTRACT

A procedure is disclosed for initializing with security and integrity a large number of terminals in an EFT-/POS network with cryptographic variables. Each terminal in the network is provided with a cryptographic facility which performs the necessary cryptographic functions. A key distribution center is established, and a public and secret key pair is generated for the key distribution center. Each terminal in the network is provided with a terminal identification known to the key distribution center, the public key of the key distribution center is stored in the cryptographic facility of each terminal. A terminal initializer is designated for each terminal, and the terminal initializer for each terminal is notified of two expiration times for the purposes of registering the terminal's cryptovariable with the key distribution center. The cryptovariable is generated by the terminal using its cryptographic facility. Prior to the first expiration time, a registration request is prepared and transmitted to the key distribution center. The registration request includes the terminal identification and the cryptovariable. When the key distribution center receives this request, the cryptovariable is temporarily registered and that fact is acknowledged to the requesting terminal. After the expiration of the second time, the registration is complete. Provisions are also made for invalidating a terminal identification in the event that more than one registration is attempted for a given terminal identification or that the registration was not made in time. The same procedure can be used to initialize cryptovariables of users of a network. The protocol is basically the same except that a user identification is used instead of a terminal identification, and the users may be provided with a transportable media, such as a magnetic stripe card or the like, which stores the user cryptovariable and can be read by terminals in the network.

15 Claims, 3 Drawing Sheets

INITIALIZATION OF CRYPTOGRAPHIC VARIABLES IN AN EFT/POS NETWORK WITH A LARGE NUMBER OF TERMINALS

BACKGROUND OF THE INVENTION

1. Field of the Invention

The present invention generally relates to secure information handling systems and, more particularly, to information handling systems in the form of an Electronic Funds Transfer or Point of Sales (EFT/POS) network with a large number of terminals wherein information is protected by cryptographic techniques. The invention specifically relates to cryptographic key initialization techniques for such systems and requires a Key Distribution Center (KDC) to manage the keys. The KDC has a Public Key (PKkdc) and a Secret Key (SKkdc), with the PKkdc being installed at each terminal in the system. The procedure according to the invention requires a person to be designated for each terminal to carry out an initialization procedure that initializes a terminal or user key at the KDC. Transportation and distribution of keys via couriers is eliminated.

2. Description of the Prior Art

Cryptographic methods are required whenever information must be sent securely through an uncontrolled, possibly hostile, environment such as a communications network. To employ these methods requires the initialization of system nodes with cryptographic variables, i.e., cryptographic keys. Initiatialization procedures are required for networks with large numbers, perhaps hundreds of thousands, of terminals in locations with low physical security. Such networks are typified by modern Electronic Funds Transfer (EFT) and Point of Sale (POS) networks such as those used by interstate banking and retailing establishments.

Normally, security personnel are employed to initialize a system with cryptographic keys. In an implementation using a symmetric algorithm, such as the Data Encryption Algorithm (DEA), trusted personnel must handle secret keys. In an implementation using an asymmetric algorithm such as the Rivest, Shamir, Adleman algorithm (RSA), trusted personnel might also initialize the system with secret keys, although here it is possible to require only public keys to be distributed. (An asymmetric algorithm is also referred to as a Public Key Algorithm (PKA).) In the latter approach, the required secret key and corresponding public key are generated internally by the node. The secret key is stored whereas the public key is displayed so that it can be distributed by security personnel to the appropriate node communicating with the terminal. (A channel with integrity is required since otherwise a fake public key, corresponding to a fake secret key, might be accepted by the authenticating node.)

As the number of terminals in a network grows, one might expect that a certain economy-of-scale would come into play to reduce the overall cost of distributing keys using security personnel (e.g., couriers). However, current projections indicate quite the opposite, and it is expected that the cost of key distribution using couriers will grow at least proportionally with the number of terminals, and perhaps even more. Although it is true that travel distances between sites serviced by such couriers might well be reduced as more and more nodes are located within a given geographical area, the increased work in scheduling and coordinating courier visits at these sites would undoubtedly more than offset this expected advantage. Another major difficulty would involve smaller networks joining with larger networks, or joining of several small networks into one large network. The problem is that a small network joining a large network might well find that key distribution is not limited to only the small network. It might require key distribution across the total network.

An early approach to key distribution, the courier-based distribution of secret keys is well known in the art. One of the first proposals for handling key distribution with a PK algorithm simply involved the exchange of public keys over a communication channel by a pair of devices wishing to communicate. This technique, however, lacked integrity since it was possible for an adversary to pose as a genuine node merely by sending his public key to another party in the network. An adversary could also perform an active attack against two devices intending to enter into a communication by intercepting the exchanged public keys and forwarding his own public key to the respective devices. This would allow the adversary to intercept, decrypt, read, and reencrypt all communications from one device to another.

Another proposal for distributing public keys was to register them with a key distribution center. Anyone wishing to communicate with a particular party would first contact the KDC to obtain a copy of that party's public key. To provide integrity, the KDC would prepare a short message containing the public key and the ID of the device or user to which the key belonged and the "sign" this message by decrypting the message using the secret key of the KDC. In advance, the public key of the KDC would be distributed to each node or device in the system, which could then be used to validate the message containing the public key and signature received from the KDC by encrypting the received signature with the public key. This then provided a path with integrity to distribute the public keys of each user or device. There remains, however, the issue of integrity of the keys during registration. As the initial registration process could merely consist of communicating the public key to the KDC in some sort of message saying that this is my key and please register it, an adversary could falsely register a public key in the name of someone else.

Racal-Milgo has implemented a method of key distribution via a PK algorithm. Aware of the potential for spoofing, Racal-Milgo implemented an anti-spoofing procedure involving a telephone call in which the parties verified their respective public keys by comparing verification information calculated on the public keys. Briefly, two parties who wish to communicate each generate a public key/secret key pair and then exchange their public keys via the communication channel. Upon receipt of the public key, each party calculates a prescribed function of the public key. The parties then contact each other via telephone and exchange the calculated values, which are then verified by the originating parties. If the correct values are communicated, then each party has received the correct public key. This procedure is described in an article entitled "Public Key Security" by C. R. Abbruscato published in the December 1984 issue of *Telecommunications*. The weak link in this anti-spoofing defence is that the telephone channel itself must have integrity or the callers must recognize each other's voice.

Bell Telephone Laboratories has described a similar technique for anti-spoofing which pre-dates the Racal-Milgo technique. Bell's technique involves verifying the public keys by calculating and mailing the key validation information to the originating node instead of communicating the information by voice over a telephone communication channel. Otherwise, the concept is the same. The procedure is described in an article by Frank H. Myers entitled "A Data Link Encryption System", NTC Conference Record, National Telecommunications Conference, Washington, D.C., Nov. 27–29, 1979. Again this anti-spoofing defense requires that the postal system handling mail have integrity, else the anti-spoofing check could again be spoofed.

In a recent paper, Carl H. Meyer and Stephen M. Matyas describe a method of key installation/distribution. See "Installation and Distribution of Cryptographic Variables in an EFT/POS Network with a Large Number of Terminals", Proceedings of SECURICOM 86 (1986). This approach calls for the installation of the secret terminal keys at a trusted node, for example, a Key Distribution Center (KDC). The terminals with their installed keys are then transported to their final destinations. The secret initial terminal key is protected during transport (initial key distribution) by a secure hardware design defined a Tamper Resistant Module (TRM) which appears to achieve the highest degree of key protection. This procedure has the same degree of complexity and security whether the employed cryptographic algorithm is symmetric (e.g., the Data Encryption Algorithm (DEA)) or symmetric (e.g., the Rivest, Shamir, Adleman algorithm (RSA)).

Another approach allows the initial secret terminal keys to be distributed with key mailers, similar to the procedures used to distribute Personal Identification Numbers (PINs). Although this approach of initial key distribution is less costly and does not require terminal initialization at a trusted node, it is less secure since it is easier to obtain secret information by intercepting mail than by attacking a TRM design.

With the trend toward networks with hundreds of thousands of terminal devices, the need for cost effective, practical, and secure techniques for the distribution of cryptographic keys poses a special challange to the designer of a cryopgraphic system. The need for secret cryptographic keys at each system node can be demonstrated by one of the more important security requirements; i.e., the requirement to assure unaltered transmission of messages between network nodes. If this requirement is satisfied, it is said that the messages have integrity. To achieve this requires the introduction of cryptographic error detection codes. Such a code must be a function of the message and a secret quantity such that even a minute change in the message will have a corresponding change in the code. A secret quantity is required in generating this code in order that only the owner of such a secret key can generate a valid quantity. (The cryptographic concepts used applies to a check for message integrity as well as to assure the integrity and authenticity of other entities such as system nodes, cryptographic keys, and system users.) Consequently, the requirement to provide message integrity checks dictates the installation of secret keys in all system nodes.

Another problem posed by large networks is how to provide sufficient message security, integrity as well as secrecy, in an environment where the network entry point devices have low physical security. A low cost POS terminal installed in a supermarket is a good example of this. In such an environment, it would be unwise to store a secret key in terminals that would compromise network security beyond that of the single terminal, should the key become compromised. Also it would be advantageous if the compromise of such a key would not allow an adversary to decrypt previously transmitted and intercepted data.

The anticipated cost and other associated problems with courier-based key distribution in networks with very large numbers of nodes has caused a heightened concern to find better, less expensive, and equally secure methods of key distribution than traditional courier-based methods.

As further background to the present invention, the reader may make reference to U.S. Pat. No. 4,200,770 to Hellman et al, U.S. Pat. No. 4,218,582 to Hellman et al and U.S. Pat. No. 4,405,829 to Rivest et al for discussions of public key algorithms. Also of interest is U.S. Pat. No. 4,206,315 to Matyas et al which describes on column 4, line 62, to column 6, line 17, the generation of a message and signature. U.S. Pat. No. 4,386,234 to Ehrsam et al describes at column 5, lines 26 to 42, a terminal with an integrated security device. This device is the cryptographic facility which is described by Meyer and Matyas in *Cryptography: A New Dimension in Computer Data Security,* John Wiley & Sons (1982), at pages 222 to 226. U.S. Pat. No. 4,238,853 to Ehrsam et al shows in FIG. 9 and describes in the text on column 20, lines 49 to 68, and column 21, lines 1 to 9, a procedure for generation of random numbers which can be used by the host data security device (i.e., cryptographic facility) as part of a process of generating cyrptographic keys. In the same patent, at column 4, lines 54 to 68, and column 5, lines 1 to 51, there is a description of the host data security device and the key generation process.

SUMMARY OF THE INVENTION

It is therefore an object of the present invention to initialize with security and integrity a large number of nodes in an information handling system with cryptographic variables without requiring couriers to transport these cryptographic variables.

Initialization of the terminal is performed by a designated representative called the terminal initializer. In all cases, the terminal initializer is a person who will act responsibly to carry out the steps of the terminal initialization procedure, such procedure comprising the steps of causing the terminal to generate and register one or more cryptovariables with a designated Key Distribution Center (KDC) and promptly reporting to the KDC any encountered problems. Typically, the terminal initializer will be an employee of the organization at the location where the terminal is physically installed, such as a terminal user, terminal owner, manager, or member of the local site security. In situations where a third party key distribution center is employed, the terminal initializer may be a locally appointed agent of the KDC. The terminal initializer has no responsibility for transporting keys, public or private, or for installing secret keys by entering them directly into a cryptographic device. Therefore, the terminal initializer is not a courier, and does not perform the functions of a courier.

According to one embodiment of the invention using a public key algorithm, each terminal in the network is provided with a cryptographic facility (CF) consisting of hardware and software components that perform the necessary cryptographic functions to support the required cryptographic operations. A subset of these functions support the terminal initialization procedure of the invention. Overall cyrptographic security, including that of the terminal initialization procedure, rests on an assumption of integrity of the CF, including stored keys and programs, and associated supporting software, which is guaranteed by the design and by other physical security measures instituted by the user. Prior to the terminal initialization procedure according to the invention, the KDC generates a public key and secret key pair (PKkdc, SKkdc), which are the keys that operate with the public key algorithm. A unique nonsecret Terminal Identifier (TID) and the public key of the Key Distribution Center (PKkdc) are assumed to have been installed in the CF of the terminal. The PKkdc could be installed, for example, in microcode as part of the manufacturing process of the terminal. Alternatively, it could be installed at a central location and the terminals with the installed PKkdc and TID shipped to the final destination, or it could be installed by the terminal initializer, that is, locally after the terminal has been installed.

For each terminal which is to be initialized, as previously mentioned, the KDC designates a terminal initializer who is responsible for carrying out the necessary terminal initialization procedure at that device. Each terminal initializer is provided with a set of instructions outlining the terminal initialization procedure. The security of the procedure rests on the assumption that the terminal initializer will comply with the issued instructions and understands that failure to comply with these instructions may result in an adversary successfully registering a key with the key distribution center. The KDC also provides to the terminal initializer two expiration dates, oridinarily separated by several days, which delimit periods of time in which certain prescribed steps within the terminal initialization procedure must be completed. The security of the procedure rests on the assumption that the terminal initializer receives notifications of the two expiration dates and the terminal initialization instructions at some time well in advance of the expiration dates so that the steps of the procedure can be performed within the prescribed alotted time.

According to the terminal initialization procedure of the invention, prior to the first expiration date, a cryptovariable can be temporarily registered at the KDC under the designated TID provided that the TID has not been invalidated and no other prior cryptovariable has been registered for that TID. In the specific embodiment disclosed herein, the cryptovariable registered is a public key, and therefore this process is called "public key registration." If a public key has already been registered under a given TID, an attempt to register a different public key under that same TID will result in the TID being invalidated. After the first expiration date, the "public key registration" process is disabled at the KDC for that TID.

Prior to the second expiration date, the KDC permits a TID to be invalidated without "proof" of the indentity of the requestor. This process is called "ID invalidation without proof of identity." After the second expiration date, the process of "ID invalidation without proof of identity" is disabled for that TID, and the temporary status of the registration is considered changed to that of a permanent registration.

After the second expiration date, the KDC permits a TID to be invalidated only after the requestor has been identified and authenticated and his or her authorization to invalidate that TID has been verified. This process is called "ID invalidation with proof of identity".

After the second expiration date and upon request, the KDC will issue a PK Certificate for any TID provided that the TID is valid and a public key has been registered for that TID. A PK Certificate consists of a TID, public key, certificate expiration date, other data, and a digital signature produced on the foregoing data using the secret key of the KDC. One recommended method for calculating a signature is to first calculate an intermediate value or function of the message, using a strong one-way cryptographic function. This intermediate value is then decrypted with the secret key SKkdc to produce the signature. U.S. Pat. No. 4,206,315 describes, for example, a signature technique which calculates the signature on a one-way function of the message instead of the message itself. U.S. Pat. No. 4,405,829 describes the process of encryption and decryption with the so-called RSA public key algorithm. If the TID is invalid or no public key has been registered, an appropriate response message is prepared on which a digital signature is calculated using the secret key of the KDC and the message and signature are returned to the requesting terminal.

Under normal operating conditions, the terminal initialization procedure proceedes as follows. Well in advance of the first expiration date, a public key and secret key pair are generated at the terminal using an available key generation procedure. A public key registration request message containing the TID and public key of the terminal is sent to the KDC. Under normal conditions no adversary will have interferred with the process, and therefore no public key will yet be registered under the designated TID. Therefore, the KDC registers the public key under the specified TID, prepares an appropriate response message containing the TID and public key on which a digital signature is calculated using the secret key of the KDC in the manner previously described, and the message and signature are returned to the requesting terminal. After authenticating the received message, the requesting device signals the terminal initializer that the desired public key has been temporarily registered at the KDC under the specified TID. The procedure for authenticating a signature is similar to the procedure for calculating a signature. The same intermediate one way function of the message, which was used in calculating the signature, is again calculated from the message. The signature is then encrypted using the public key of the KDC (PKkdc), and the recovered one way function of the message is compared for equality with the calculated one way function of the message. If the comparison is favorable, the message and signature are accepted; otherwise, if the comparison is unfavorable, the message and signature are rejected.

The protocol now requires a delay, and the terminal initializer must now wait for the passage of the second expiration time in order that the KDC may assure that the temporarily registered public key is genuine; i.e., that it originated from the authorized, appointed terminal initializer. After the second expiration time, a terminal-initializer-initiated message containing the TID is sent to the KDC requesting "ID Verification" for that TID. Under normal conditions no adversary will have interferred with the process and therefore the specified TID will be valid and the previously temporarily registered public key will still be registered, but due to the expiration of the second time, the registration is now considered permanent. Therefore, the KDC prepares and returns a message to the requesting terminal specifying the registered PK for that TID. A digital signature is prepared on this message using SKkdc which allows the requesting terminal to authenticate the received message using the installed PKkdc in the manner previously described. This signals satisfactory completion of the terminal initialization procedure and provides the necessary proof that the desired public key has been successfully registered at the KDC. Alternatively, the KDC could return a PK certificate to the requesting terminal, and this would also serve as proof to the terminal that the public key had been registered.

Once an authenticated response has been received from the KDC stating that a public key has been temporarily registered or that the TID has been invalidated, the worst that could happen is that an adversary could cause a genuine temporarily registered public key to be erased by invalidating the TID prior to the second expiration time. Hence, for practical purposes, a "safe" state is reached, and it is therefore possible with no loss in security to allow a protocol variation wherein the terminal-initializer-initiated message sent to the KDC requesting "ID verification" following the second expiration time can be replaced by a similar terminal-user-initiated message. This protocol variation has the advantage that ordinarily the terminal initializer can complete the terminal initialization procedure with only one terminal visit, prior to T1. The terminal user, who is notified by the terminal initializer of the terminal initialization status and the value of T2, completes the protocol after the second expiration time. Of course, the protocol variation is the same as the original protocol when the cerminal initializer and the terminal user are the same person.

In a network where it is convenient for the KDC to send messages to the terminals, such as in a store-and-forward electronic mail distribution system, yet another variation on the protocol is possible. The step following the second expiration time wherein a terminal-initializer-initiated or terminal-user-initiated message is sent to the KDC requesting "ID verification" is replaced by a step wherein the KDC automatically prepares and sends a response to the original requesting terminal. This response is just the same as that which would have been sent in response to a request for "ID verification" except here the response is triggered by reaching the second expiration time rather than upon receiving a request message. Otherwise, the protocol is the same. If no response is received at the terminal within a reasonable period of time after the second expiration time, the terminal initializer or the terminal user, depending on which protocol is used, reports this discrepency to the KDC.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE PREFERRED EMBODIMENT OF THE INVENTION

Figure 1:
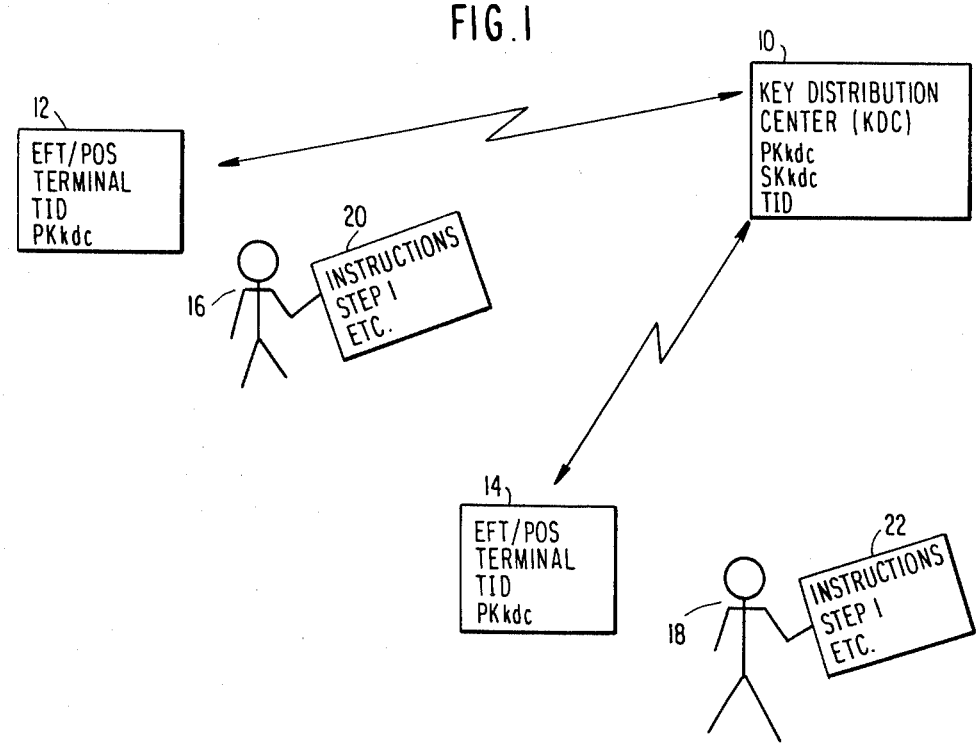
FIG. 1 is a block diagram of an EFT/POS network showing the initial states of the key distribution center and several terminals, with a terminal initializer for each terminal.

Referring now to the drawings, and more particularly to FIG. 1, there is shown in simplified block diagram form an EFT/POS network which includes a Key Distribution Center (KDC) 10 and a two EFT/POS terminals 12 and 14 of what may in fact be hundreds of thousands of terminals in the network. There is installed a Public Key, PKkdc, and a Secret Key, SKkdc, at the KDC 10. PKkdc is also installed in each of the terminals 12 and 14, and each terminal is provided with its own Terminal Identification (TID) number. The generation of PKkdc, SKkdc at the KDC and the installation of PKkdc and TID at the terminal is well within the current state of the art. It is recommended, although not required, that the assigned TIDs constitute a sparse set (e.g., by some random or arbitrary selection from among a very large set of possible numbers). This would diminish interference and disruption from common "hacker"-related attacks. The notion is that even though the TIDs are nonsecret, there is no reason to make them easy to guess.

Figure 2:
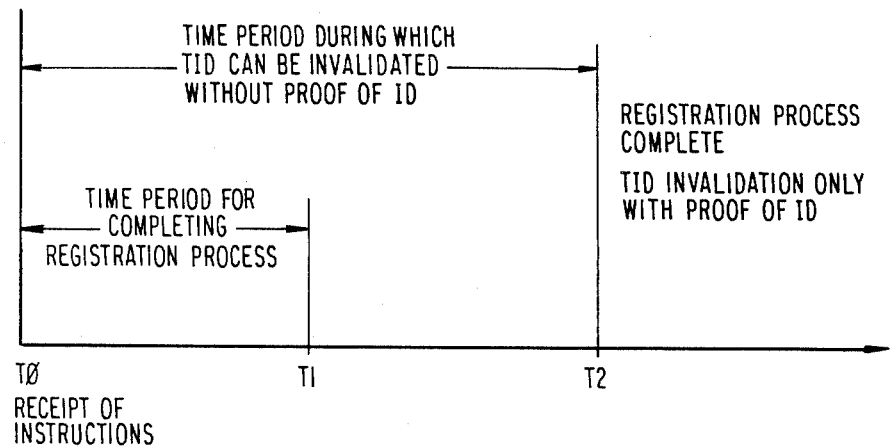
FIG. 2 is a time line diagram showing in graphical form the rules for the public key registration of a terminal in the system shown in FIG. 1.

Terminal initializers 16 and 18 are assigned to each terminal 12 and 14, respectively. Each terminal initializer 16 and 18 is provided with a set of terminal initialization instructions 20 and 22, respectively. The terminal initializers do not necessarily receive their instructions on the same date. These instructions may include two expiration times, T1 and T2, or the two expiration times could be separately communicated to the terminal initializers. Ordinarily, T1 and T2 would be different among the terminals, but they might be the same for an installation grouping. For example, terminal initializer 16 might receive his instructions on Jan. 1, 1986, and be assigned expiration times of 12 o'clock midnight on Jan. 15, 1986, for T1 and 12 o'clock midnight on Jan. 22, 1986, for T2. Terminal initializer 18, on the other hand, might receive his instructions on Feb. 5, 1986, and be assigned expiration times of 12 o'clock midnight on Feb. 19, 1986, for T1 and 12 o'clock midnight on Feb. 26, 1986, for T2. Denoting the date of receipt of the installation instructions as T∅, the rules for the public key registration with respect to the expiration times T1 and T2 are shown in FIG. 2.

The terminal initialization procedure comprises a series of steps that must be performed by the designated terminal initializer. The terminal initializer is a person who can be counted on to act responsibly to carry out the steps of the terminal initialization procedure. Typically, the terminal initializer will be an employee of the organization at the location where the terminal is physically installed, such as a terminal user, terminal owner, manager, or member of the local site security. As mentioned, the KDC provides the designated terminal initializer with two expiration dates, T1 and T2. As illustrated in FIG. 2, the first of these dates, T1, represents a cutoff date by which the public key portion of the terminal initialization procedure must be completed, and the second of these dates, T2, defines the expiration of a grace period which the terminal initializer must report to the KDC if he or she has not received from the KDC an authenticated, positive notification that the requested public key for the requested TID has been temporarily registered or the requested TID has been invalidated. As mentioned, the terminal initializer receives T1 and T2 with the initialization instructions or T1 and T2 could be separately communicated to the terminal initializer. The public mail system or an internal company-wide private mail system could be used to distribute the terminal initialization instructions.

The terminal initialization instructions will now be described with reference to the state diagrams shown in FIGS. 3 and 4 of the drawings. Reference may also be had to FIG. 2 which shows the time line diagram that graphically illustrates the rules of the initialization procedure according to the invention.

In step 1 of the initialization procedure, the terminal initializer is reminded that he or she should have received two notification letters from the key distribution center. Each notification specifies that as the assigned terminal initializer for the designated terminal, a set of terminal initialization instructions should be received by a specified date. The instructions specify what the terminal initializer is to do in the event that the corroborating notices were not received. The instructions also contain certain vital information, some of which may be optional information, such as the name of the terminal initializer, device ID, first and second expiration dates and times, which the terminal initializer must check for reasonableness. If the current date and time is beyond the first expiration date and time, but not beyond the second expiration date and time, the procedure begins with to Step 5 of the instructions to invalidate the TID. This is represented in the state diagram of FIG. 3 as a change from state 1 to state 2. If the current date and time is beyond the second expiration date and time, the procedure begins with Step 6 where proof of identity will be required to invalidate the TID. This is represented in FIG. 3 as a change in the state diagram from state 2 to state 3. These special conditions will be discussed in more detail later with respect to the referenced steps. For the time being, it will be assumed that T1 has not yet expired.

In step 2, the terminal initializer causes the generation of a terminal public key and secret key pair using the terminal's cyrptographic facility. This step is part of a procedure referred to as "personalization" and is preparatory to the public key registration.

In step 3, the terminal initializer performs the public key registration with the key distribution center, provided that the current date and time is prior to the first expiration time, T1, as indicated in FIG. 2. This is accomplished by sending a PK registration request message containing the terminal ID (TID), device public key, and time-variant data to the KDC. A telephone number may be dialed as one way to establish a connection with the key distribution center. The terminal then sends the prepared PK registration request message to the KDC. In response to a received PK registration request message, the KDC prepares an appropriate response message reflecting the state of the KDC and the outcome of processing the PK registration request message, the public key registered or temporarily registered for the requested TID, the requested TID, plus the same time-variant data received in the request message. A digital signature is calculated on the response message using the secret key, SKkdc, of the KDC and using the procedure for calculating signatures previously described, and the message and signature are sent to the requesting terminal. If a response message and signature are received from the KDC, the terminal authenticates the message and signature using the KDC public key, PKkdc, in the manner previously described.

Several outcomes are possible for the actions initiated in the public key registration process: (a) a connection could not be made with the KDC, (b) no response was received from the KDC, (c) the response received from the KDC was invalid or insufficient to determine the state of the KDC, (d) a valid response was received from the KDC indicating that the KDC is in state A and no action has been taken by the KDC, (e) a valid response was received from the KDC indicating that the KDC has transitioned from state A to state B and that the requested public key has been temporarily registered, (f) a valid response was received from the KDC indicating that the KDC is in state C and that a public key different from the requested public key is already registered, or (g) a valid response was received from the KDC indicating that the KDC is in state D, i.e., the TID in the public key registration request message has been or was previously invalidated at the KDC.

If outcome a, b or c occurs, the registration status will be uncertain. In that case, and also for outcome d which indicates that no public key has yet been temporarily registered, the terminal initializer may try again. If outcome e occurs, the procedure requires that the terminal initializer wait for the expiration of the second expiration time and then verify that the terminal's public key has been registered (Step 4). This outcome is indicated by the state change from state 1 to state 4 in the state diagram of FIG. 3 and the state change from state A to state B in the state diagram of FIG. 4. If outcome f occurs, it signifies to the terminal initializer the second expriration time passed and that a potentially different public key has already been registered under the TID specified in the public key registration request message. In this case, the terminal initializer must invalidate the TID using a procedure which requires proof of identity (Step 6). This outcome is indicated by the state change from state 1 to state 3 in the state diagram of FIG. 3. If outcome g occurs, the TID is invalidated, and no further action is required. This outcome is indicated by the state change from state 1 to state 7 in the state diagram of FIG. 3 and either the state change from state B to state D or that the original state D remains unchanged in the state diagram of FIG. 4.

In Step 4, the terminal initializer performs a verification that the terminal's public key has been registered at the key distribution center following the expiration of the second expiration time or, more generally, to query the status of the KDC at any time. To perform this step, it is not necessary that the terminal initializer be located at the designated terminal as any terminal with a cryptographic facility that has been properly initialized will suffice. When performing the ID verification, an ID verification request message containing the TID and time-variant data is first prepared. Then a telephone number may be dialed to establish a connection with the KDC. In response to a received ID verification request message, the KDC prepares an appropriate response message reflecting the state of the KDC and the outcome of processing the ID verification request message. The response message contains the TID, optionally expiration times T1 and T2 for TID, terminal ID status at the KDC, public key registered or temporarily registered at the KDC, and the same time-variant data received in the ID verification request message. A digital signature is calculated on the response message using the secret key, SKkdc, of the KDC in the manner previously described, and the message and signature are sent to the requesting terminal. If a response message and signature are received from the KDC, the device authenticates the message and signature using the KDC public key, PKkdc, again in the manner previously described.

Several outcomes are possible for the actions initiated in the ID verification process: (a) a connection could not be made with the KDC, (b) no response was received from the KDC, (c) the response from the KDC was invalid or insufficient to determine the state of the KDC, (d) a valid response was received from the KDC indicating that the KDC is in state A, i.e., the first expiration time has not yet expired and a public key has not yet been temporarily registered, (e) a valid response was received from the KDC indicating that the KDC is in state B and that a public key whose value is specified has been temporarily registered, (f) a valid response was received from the KDC inidcating that the KDC is in state C and that a public key whose value is specified has been registered, or (g) a valid response was received from the KDC indicating that the KDC is in state D, i.e., the TID has been invalidated.

The ID verification can be used at any point in the terminal initialization process to determine the state of the KDC, although its primary purpose is to determine the state of the KDC after a public key has been temporarily registered and the second expiration time has expired. In that event, only two outcomes f and g are possible. Outcome f indicates that the temporarily registered public key now becomes permanently registered. No action is required; the terminal initialization procedure has been completed. Outcomes a through g indicate no state changes in FIGS. 3 or 4.

Variations in the basic protocol are possible. Once an authenticated response has been received from the KDC stating that a public key has been temporarily registered or that the TID has been invalidated, the worst that can happen is that an adversary could cause a genuine temporarily registered public key to be erased by invalidating the TID prior to the second expiration time. Thus, it is possible with no loss of security to replace the terminal-initializer-initiated message requesting "ID verification" to be replaced by a similar terminal-user-initiated message. Alternatively, the terminal-initializer-initiated or the terminal-user-initiated message could be replaced by a step wherein the KDC automatically prepares and sends a response to the requesting terminal upon reaching the second expiration time.

The terminal initializer would use Step 5 to invalidate the TID without proof of identity. This step is performed only when the current date and time is prior to the second expiration date, T2, as indicated in FIG. 2. Again, the terminal initializer does not need to be located at the designated terminal as any terminal in the network with an installed cryptographic facility which has been properly initialized will suffice. An ID invalidation request message containing the TID and time-variant data is first prepared. A telephone number may be dialed to establish a connection with the KDC. The terminal then sends the previously prepared ID invalidation request message to the KDC. In response to a received ID invalidation request message, the KDC invalidates the device ID provided that the current date and time is prior to the second expiration time, T2. The KDC then prepares an appropriate response message reflecting the state of the KDC and the outcome of processing the ID invalidation request message, plus it includes the same time-variant data received in the request message. A digital signature is calculated on the response message using SKkdc in the manner previously described, and the message and signature are sent to the requesting terminal. If a response message and signature are received from the KDC, the terminal authenticates the message and signature using PKkdc, in the manner previously described.

Again, several outcomes are possible: (a) a connection could not be made with the KDC, (b) no response was received from the KDC, (c) the response received from the KDC was invalid or insufficient to determine the state of the KDC, (d) a valid response was received from the KDC indicating that the KDC is in a state other than state D, or (e) a valid response was received from the KDC indicating that the KDC is in state D.

Figure 3:
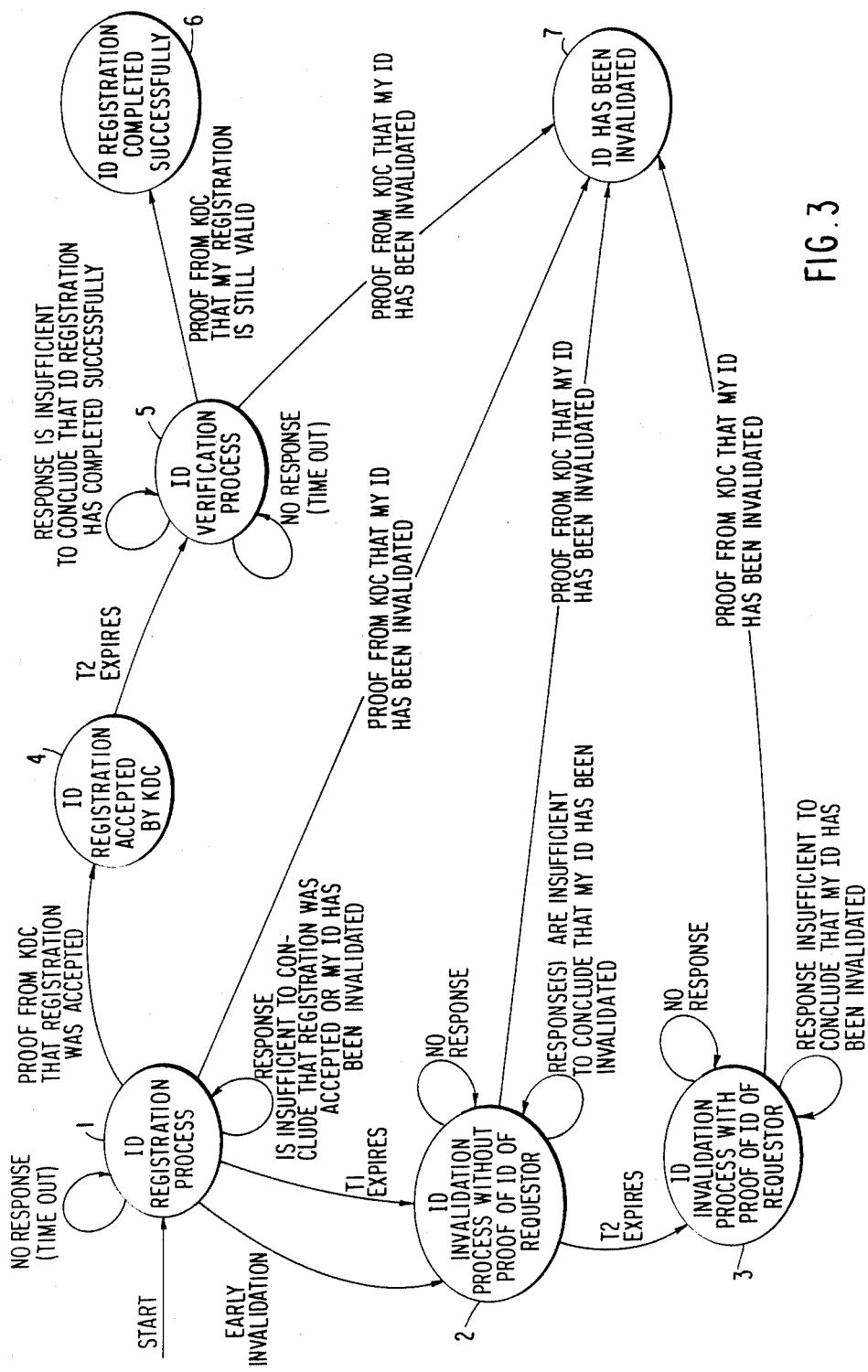
FIG. 3 is a state diagram showing the possible states of a terminal in the terminal initialization procedure according to the preferred embodiment of the invention.
Figure 4:
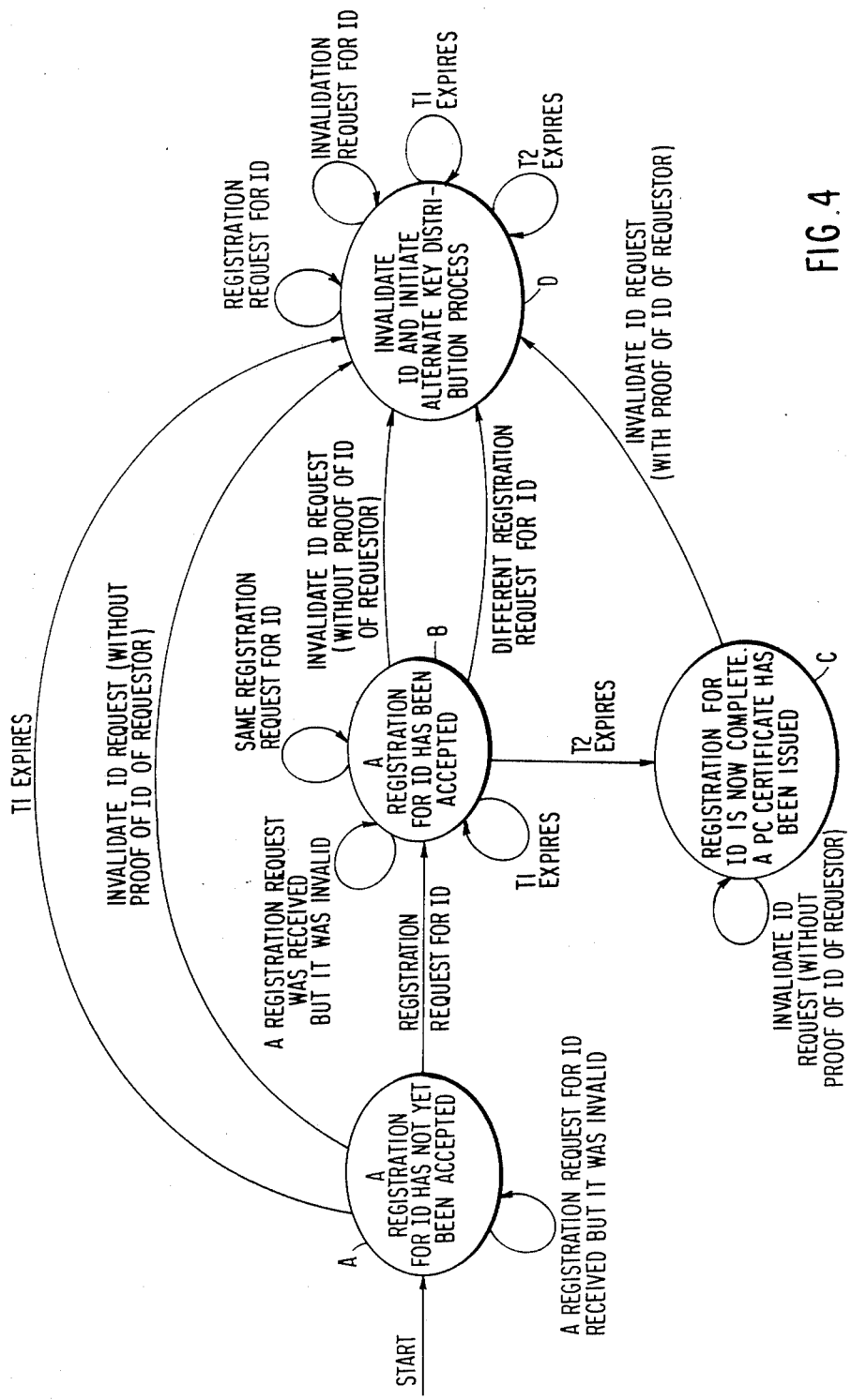
FIG. 4 is a state diagram showing the possible states of the KDC in the terminal initialization procedure according to the preferred embodiment of the invention.

Outcome a, b, c, or d indiates no state change in FIGS. 3 or 4. Outcome e is indicated in FIG. 3 by the state changing from state 2 to state 7 and in FIG. 4 by the state changing from state A to state D, from state B to state D, or that the original state D remains unchanged.

It is also possible to use an ordinary voice-grade telephone channel to request ID invalidation. The terminal initializer selects and dials one of the numbers provided for the purpose and, when a connection is made, verbally requests that the TID be invalidated. The terminal initializer will then be provided with an ID invalidation confirmation number if the ID invalidation request is accepted. The terminal initializer must now authenticate the ID invalidation confirmation number, and this is done by using the ID invalidation confirmation number and the TID as inputs to a nonsecret one-way cryptographic function to calculate a reference number. This reference number is compared for equality with an ID invalidation number which is provided in the initialization instructions or which may be separately communicated to the terminal initializer; e.g., with the first and second expiration times T1 and T2. If the comparison is favorable, the terminal ID invalidation was successful. A simple and straight forward procedure for implementing the concept of an ID invalidation number is as follows. For each TID, the KDC randomly selects a unique 64-bit ID invalidation confirmation number. The 64-bit invalidation number is calculated by encrypting the TID using the ID invalidation confirmation number as a cryptographic key. Using the ID invalidation confirmation as a cryptgraphic key thus makes it impossible to reverse; i.e., given the TID and the ID invalidation number, it is impossible to derive the ID invalidation confirmation number. The so produced ID invalidation confirmation numbers are stored at the KDC indexed by TID, whereas the ID invalidation numbers are distributed to the terminal initializers.

Step 6 is used for ID invalidation but with proof of identity to minimize potential disruption and denial of service. This step must be performed whenever the current date and time is past the second expiration time, T2, as shown in FIG. 2. The verification portion of Step 6 requires that the terminal initializer be located at a properly initialized terminal with an installed cryptographic facility.

Ordinarily, multiple options would be available for proving identity and invalidating a TID. However, time is of the essence. A fraudulantly registered key should be invalidated within the system as quickly as possible. A separate authorization channel to the KDC is the key element, and proof of identity could be based on a password, personal key, magnetic stripe card, voice recognition, or other techniques well established within the state of the art for proving identity. Another possiblity involves a face to face meeting with security personel who are authorized to invalidate a registered key. Proof of identity could be based on personal recognition or identifying documents including the original initialization instructions and letters of notification. An ID invalidation confirmation number is provided to the terminal initializer using any convenient communication channel after the request for ID invalidation has been accepted by the KDC. The terminal initializer authenticates the ID invalidation confirmation number using the same procedure described earlier under Step 5 for ID invalidation without proof of identity. The successful completion of this step is reflected in the state diagram of FIG. 3 by the state changing from state 3 to state 7.

With more specific reference to FIG. 3 of the drawings, there is first shown the state diagram of a terminal in a network for the procedure outlined above. Beginning at "Start", the public key registration process is invoked at state 1. Assuming first that the process is carried out normally, the terminal received from the KDC a message that the registration was accepted and this message is authenticated by the terminal. The state now becomes state 4 indicating that the requested public key has been temporarily registered at the KDC.

State 4 includes a delay or wait process which exprires with T2, thus signalling the expiration of the period during which the TID can be invalidated without proof of the requestor's identity. At the expiration of T2, the state becomes state 5 which is the ID verification state. Two conditions are shown which cause no transition from state 5. One of these is a time out condition indicating that no response to an ID verification request message has been received from the KDC, and the other is an indication that a response to an ID verification request message has been received from the KDC but is insufficient to conclude that ID verification has completed successfully. In either case, the terminal initializer may retry the ID verification process. On the other hand, if a verification response message is received from the KDC indicating that the requested public key is permanently registered and the response is authenticated by the terminal, the state changes to state 6 providing an indication that the public key registration was completed successfully. Alternatively, the KDC may provide a response message to the terminal that the TID has been invalidated, in which case if the response message is authenticated the state changes to state 7 providing an indication that the public key registration was unsuccessful and that terminal initialization will be carried out using a secondary or backup procedure.

Returning now to state 1, it will be observed that there are two conditions which cause no state transition out of state 1. The first of these is a time out condition indicating that no response was received from the KDC in response to the public key registration process. The second provides an indication that the response received is insufficient to conclude that either the public key registration was accepted or that the TID has been invalidated. In either case, the terminal initializer may retry the public key registration process. Several conditions can cause a state change. If the public key registration process has not been completed prior to the expiration of T1, the state becomes state 2 providing an indication that the public key registration process is no longer accepted by the KDC. If a public key registration response messsage is received from the KDC indicating that the TID has been invalidated and the response is authenticated by the terminal, the state changes to state 7 providing and indication that public key registration was unsuccessful and that terminal initialization will be carried out via a secondary or backup procedure. If T1 expires before the public key registration is made with the KDC, then the state becomes state 2 where ID invalidation can be made without proof of identity. It is also possible to move to state 2 prior to the expriation of T1 if the terminal initializer decides to invalidate the TID rather than continue with the public key registration process.

State 2 has two conditions which cause no state tranition out of state 2. The first is a time out condition indicating no response has been received from the KDC in response to the ID invalidation procedure. The second indicates that a response was received from the KDC but is insufficient to conclude that the ID has been invalidated. In either case, the terminal initializer may retry the ID invalidation procedure. On the other hand, if an ID invalidation response message is received from the KDC indicating that the TID has been invalidated and the response is authenticated by the terminal, the state changes to state 7. The transition to state 7 may also occur as a result of an oral communication in which an ID invalidation confirmation number is received from the KDC and authenticated at the terminal. If the ID invalidation procedure has not been completed by the expiration of T2, then the state becomes state 3.

In state 3, ID invalidation can only be made with proof of identity. There are again two conditions which cause no state transition out of state 3. The first is a time out condition indicating no response has been received from the KDC in response to the ID invalidation procedure. The second indicates that a response was received from the KDC but is insufficient to conclude that the ID has been invalidated. In either case, the terminal initializer may retry the ID invalidation procedure. On the other hand, if a response is received from the KDC indicating that the TID has been invalidated and the response is authenticated by the terminal, the state changes to state 7.

FIG. 4 shows the state diagram for the KDC. Beginning with "Start" in state A, a registration of a public key for a requesting terminal identifier TID has not yet been received and accepted. As long as T1 has not expired, the KDC will accept a public key registration request but thereafter a registration request will not be accepted. If a valid public key registration request is received before T1, a transition from state A to state B occurs, which invokes the acceptance process for the registration process. This amounts to a temporary registration of the public key, wherein the received public key generated at the terminal is stored with the TID in a table at the KDC. The KDC then prepares a message including a signature on the message which is transmitted back to the requesting terminal to acknowledge the temporary registration of the public key. At the expiration of T2 with no intervening invalidation of the TID, a transition from state B to state C occurs, indicating that the termporarily registered public key is now permanently registered and that the registration process is complete. In this state, a public key certificate can be issued.

Returning to state A, if a public key registration request is received from a terminal but the TID or some other parameter in the request is invalid, the KDC does nothing; i.e., there is no acknowledging message sent to the terminal. If T1 expires without the public key registration process being completed, the state goes to state D where the TID is invalidated. The same result occurs from state B if before the expiration of T1 a registration request is received for the TID but for a different public key. In other words, there are two competing requests for public key registration using the same TID but for different public keys. In such a case, the state changes from state B to state D.

A transition from state A, B or C to state D also occurs as the result of a request for ID invalidation. A request for invalidation of ID without proof of identity, while in state A or B, will cause a transition to state D. If the public key registration is complete and the state is state C, an invalidation of the ID can be made only with proof of identity.

In the procedures discussed, communication with the KDC from a terminal in the network was made via a commercial telephone line. Preferrably tight control measures would be employed over the dissemination and distribution of telephone numbers used with the procedure for reporting problems, even though the telephone numbers could never be considered secret. This would lessen interference and disruption from outsiders.

The preferred embodiment of the invention as described is then a procedure for initialization of cryptographic variables in an EFT/POS network with a large number of terminals, perhaps numbering in the hundreds of thousands. The procedure recognizes that the EFT/POS terminal must be small and inexpensive and will be installed in an insecure environment. In the procedure, the terminal is equipped with a cryptographic facility which it uses to generate a terminal public key and secret key pair. The generated public key is sent without integrity by transmitting it over an exposed channel, such as a commercial telephone line. The KDC accepts the public key of the terminal and temporarily registers it under the terminal ID as long as it is before a first expiration time T1 but after a reference time and provided no prior public key has already been temporarily registered for that TID. After T2, the temporarily registered public key becomes permanently registered, provided that no request to invalidate the TID was received prior to T2. The registered public key is used in all subsequent communications with the terminal. Consequently, only the terminal which generated the corresponding secret key can decrypt information received from the KDC or any other node that has obtained a copy of the registered public key of that terminal. Alternatively, it is possible to use the described protocol to register a secret key associated with a symmetric algorithm. In this case, a secret terminal key is generated at the terminal and sent without integrity, but encrypted under PKkdc, to the KDC, where it is recovered by decrypting under SKkdc.

The general exposure of the procedure is that an opponent can always initiate a successful sign-on from his location with his terminal, provided that the real terminal never signs on before T2, and does not report this to the KDC. In that case, the fake terminal can continue to operate indefinitely. But if the real terminal signs on before T1, the KDC will detect that a second initiation was tried, although it cannot be determined which initiation is fake and which one is real. In such an event, the corresponding terminal will be taken out of the system and further investigations can be initiated. To reduce the exposure of a fake terminal being registered, the period for the registration of the public key (T1-T$\emptyset$) can be made as small as practically possible and the time parameters T$\emptyset$, T1 and T2 can be kept proprietary or secret.

From the foregoing, it will be appreciated that the invention provides a method of terminal initialization which allows a remote terminal in a network to establish a common key or cryptovariable with a KDC where in advance the remote terminal has installed in it only the public key of the KDC. It will likewise be appreciated that the invention also provides a method of user initialization which allows a user at a remote terminal in a network to establish a common user key or cyrptovariable with a KDC where in advance the remote terminal has installed in it only the public key of the KDC and the indentity of the user (UID). In this case, the key or cryptovariable generated at the terminal is associated with the user (UID) instead of the terminal (TID), and the user registers this key or cryptovariable under his UID instead of a TID. When a public key algorithm is involved, the user causes the terminal to generate a public key and secret key pair, where the public key is registered with the KDC under a UID and the secret key may be stored at the terminal or on a medium carried by the user from terminal to terminal; e.g., using a magnetic stripe card, a memory card, an intelligent secure card, a diskette or the like. When a symmetric algorithm is involved, the user causes the terminal to generate a secret key, which is registered with the KDC under the UID. During transmission to the KDC, the so-generated secret key can be protected by encrypting it under the public key of the KDC (PKkdc). The secret key is also stored in the terminal or on a medium as described above. Ordinarily, each user registers his own cryptovariables with the KDC. Except for those obvious differences, the two procedures, for terminal and user initialization, are the same.

Thus, while the invention has been described in terms of a preferred embodiment, those skilled in the art will therefore appreciate that the invention can be practiced with modifications and variations within the scope of the appended claims.

Having thus described my invention, what I claim as novel and desire to secure by Letters Patent is as follows:

1. A method for initialization of cryptographic variables in a network with a predetermined number of terminals using a public key algorithm comprising the steps of:

establishing a key distribution center and generating a public and secret key pair for the key distribution center;

providing each terminal in the network with a terminal identification known to the key distribution center and a cryptographic facility in which is stored the public key of the key distribution center;

designating a terminal initializer for each terminal in the network and notifying the terminal initializer for each terminal of two expiration times for purposes of registering a terminal cryptovariable with said key distribution center;

generating at a terminal a cryptovariable using said cryptographic facility;

prior to the first expiration time, preparing and transmitting to said key distribution center a registration request message which includes the terminal identification and said cryptovariable;

temprarily registering said cryptovariable at said key distribution center in association with said terminal identification;

invalidating said terminal identification whenever a second attempt is made to register a cryptovariable in association with said terminal identification, prior to said first expiration time; and after the expiration of said second time, permanently registering said cryptovariable at said key distribution center.

2. The method for initialization of cryptographic variables in a network as recited in claim 1 wherein the request message transmitted to said key distribution center includes time variant data and the step of temporarily registering said cryptovariable includes the step of acknowledging the temporary registration of the cryptovariable to the requesting terminal by sending a message to the requesting terminal containing the terminal identification, the cryptovariable, the time variant data echoed, and a signature using the secret key of the key distribution center.

3. The method for initialization of cryptographic variables in a network as recited in claim 1 further comprising the steps of:

installing the public key of the key distribution center in each terminal at a central location before shipping the terminal to its point of use; and shipping the terminals to their respective points of use with the public key of the key distribution center installed.

4. The method for initialization of cryptographic variables in a network as recited in claim 1 further comprising the step of installing the public key of the key distribution center in each terminal after the terminal has been installed at its point of use.

5. The method for initialization of cryptographic variables as recited in claim 1 wherein the step of generating is performed by generating a public key and secret key pair for the terminal.

6. The method for initialization of cryptographic variables as recited in claim 1 wherein the step of generating is performed by generating a secret terminal key using a symmetric algorithm.

7. The method for initialization of cryptographic variables as recited in claim 1 further comprising the step of preparing and transmitting to said key distribution center prior to the second expiration time a terminal identification invalidation request message in the event that the terminal fails to receive a positive acknowledgement from the key distribution center stating that the requested cryptovariable was temporarily registered at the key distribution center or fails to receive a positive acknowledgement from the key distribution center stating that the requested terminal identification has been invalidated by the key distribution center.

8. The method for initialization of cryptographic variables as recited in claim 1 further comprising the steps of:

proving the identification of the designated terminal initializer for a terminal after the second expiration time has passed; and requesting the invalidation of the terminal identification of that terminal if the requested cryptovariable was not registered with the key distribution center.

9. The method for initialization of cryptographic variables as recited in claim 1 further comprising the steps of:

requesting the key distribution center to provide a verification of the cryptovariable registration for the terminal identification after the second expiration time has passed; and providing verification of the registration if the terminal identification is valid and a cryptovariable was previously registered.

10. The method for initialization of cryptographic variables as recited in claim 9 wherein the step of providing verification of the registration is provided by sending a message specifying the registered cryptovariable for that terminal, the terminal identification and a signature using the secret key of the key distribution center.

11. A method for initialization of cryptographic variables in a network with a predetermined number of terminals using a public key algorithm comprising the steps of:

establishing a key distribution center and generating a public and secret key pair for the key distribution center;

providing each terminal in the network with a terminal identification known to the key distribution center and a cryptographic facility in which is stored the public key of the key distribution center;

designating a terminal initializer for each terminal in the network and notifying the terminal initializer for each terminal of two expiration times for purposes of registering a terminal cryptovariable with said key distribution center;

generating at a terminal a cryptovariable using said cryptographic facility;

prior to the first expiration time, preparing and transmitting to said key distribution center a registration request message which includes the terminal identification, time variant data, and said cryptovariable;

temprarily registering said cryptovariable at said key distribution center in association with said terminal identification;

acknowledging the temporary registration of the cryptovariable to the requesting terminal by sending a message to the requesting terminal containing the terminal identification, the cryptovariable, the time variant data echoed, and a signature using the secret key of the key distribution center;

invalidating said terminal identification whenever a second attempt is made to register a cryptovariable in association with said terminal identification, prior to said first expiration time; and after the expiration of said second time, permanently registering said cryptovariable at said key distribution center.

12. The method for initialization of cryptographic variables in a network with a predetermined number of terminals using a public key algorithm comprising the steps of:

establishing a key distribution center and generating a public and secret key pair for the key distribution center;
providing each terminal in the network with a terminal identification known to the key distribution center and a cryptographic facility in which is stored the public key of the key distribution center;
designating a terminal initializer for each terminal in the network and notifying the terminal initializer for each terminal of two expiration times for purposes of registering a terminal cryptovariable with said key distribution center;
generating at a terminal a cryptovariable using said cryptographic facility;
prior to the first expiration time, preparing and transmitting to said key distribution center a registration request message which includes the terminal identification, time variant data, and said cryptovariable;
temprarily registering said cryptovariable at said key distribution center in association with said terminal identification;
acknowledging the temporary registration of the cryptovariable to the requesting terminal by sending a message to the requesting terminal containing the terminal identification, the cryptovariable, the time variant data echoed, and a signature using the secret key of the key distribution center;
invalidating said terminal identification whenever a second attempt is made to register a cryptovariable in association with said terminal identification, prior to said first expiration time; and
after the expiration time, permanently registering said cryptovariable at said key distribution center.

13. The method for initialization of cryptographic variables in a network with a predetermined number of terminals using a public key algorithm comprising the steps of:
establishing a key distribution center and generating a public and secret key pair for the key distribution center;
providing each terminal in the network with a terminal identification known to the key distribution center and a cryptographic facility in which is stored the public key of the key distribution center;
designating a terminal initializer for each terminal in the network and notifying the terminal initializer for each terminal of two expiration times for purposes of registering a terminal cryptovariable with said key distribution center;
generating at a terminal a cryptovariable using said cryptographic facility;
prior to the expiration time, preparing at the terminal and transmitting to said key distribution center a registration request message which includes the terminal identification, time variant data, and said cryptovariable;
temprarily registering said cryptovariable at said key distribution center in association with said terminal identification;
acknowledging in a first acknowledgement, the temporary registration of the cryptovariable by sending a message to the requesting terminal containing the terminal identification, the cryptovariable, the time variant data echoed, and a signature using the secret key of the key distribution center;
invalidating at the key distribution center said terminal identification whenever a second attempt is made to register a cryptovariable in association with said terminal identification, prior to said first expiration time;
acknowledging said invalidating step to said terminal in a second acknowledgement;
preparing at the terminal and transmitting to said key distribution center prior to said expiration time a terminal identification invalidation request message in the event that the terminal fails to receive either said first or said second acknowledgement; and
after the expiration time, permanently registering said cryptovariable at said key distribution center.

14. The method for initialization of cryptographic variables in a network with a predetermined number of terminals using a public key algorithm comprising the steps of:
establishing a key distribution center and generating a public and secret key pair for the key distribution center;
providing each terminal in the network with a terminal identification known to the key distribution center and a cryptographic facility in which is stored the public key of the key distribution center;
designating a terminal initializer for each terminal in the network and notifying the terminal initializer for each terminal of two expiration times for purposes of registering a terminal cryptovariable with said key distribution center;
generating at a terminal a cryptovariable using said cryptographic facility;
prior to the expiration time, preparing at the terminal and transmitting to said key distribution center a registration request message which includes the terminal identification, time variant data, and said cryptovariable;
invalidating said terminal identification at the key distribution center in the event that a cryptovariable has been previously transmitted and temporarily registered at the key distribution center by an imposter using said terminal identification, prior to said expiration time;
acknowledging said invalidating step to said terminal;
temprarily registering said cryptovariable at said key distribution center in association with said terminal identification in the event that there has been no prior registration under said terminal identification;
acknowledging the temporary registration of the cryptovariable to the requesting terminal by sending a message to the requesting terminal containing the terminal identification, the cryptovariable, the time variant data echoed, and a signature using the secret key of the key distribution center;
invalidating said temporarily registered cryptovariable whenever a subsequent attempt is made by an imposter to register a different cryptovariable in association with said terminal identification, prior to said expiration time; and
after the expiration time, permanently registering said cryptovariable at said key distribution center.

15. The method for initialization of user cryptographic variables in a network with a predetermined number of terminals using a public key algorithm comprising the steps of:
establishing a key distribution center and generating a public and secret key pair for the key distribution center;
providing each terminal in the network with a user identification known to the key distribution center and each terminal in the network with a cryptographic facility in which is stored the public key of the key distribution center;

notifying each user of an expiration time for purposes of registering a terminal cryptovariable with said key distribution center;

generating at a terminal a cryptovariable using said cryptographic facility;

prior to the expiration time, preparing and transmitting to said key distribution center a registration request message which includes the user identification, time variant data, and said cryptovariable;

temprarily registering said cryptovariable at said key distribution center in association with said user identification;

acknowledging the temporary registration of the cryptovariable to the requesting terminal by sending a message to the requesting terminal containing the user identification, the cryptovariable, the time variant data echoed, and a signature using the secret key of the key distribution center;

invalidating said user identification whenever a second attempt is made to register a cryptovariable in association with said user identification, prior to said expiration time; and after the expiration time, permanently registering said cryptovariable at said key distribution center.

* * * * *